United States Patent [19]

DeVitis

[11] 4,103,388
[45] Aug. 1, 1978

[54] OIL DIP STICK WIPER

[76] Inventor: James L. DeVitis, 5 E. Lyons St., Duluth, Minn. 55811

[21] Appl. No.: 774,327

[22] Filed: Mar. 4, 1977

[51] Int. Cl.² .................. F01M 11/12; G01F 15/12
[52] U.S. Cl. .................................. 15/210 B
[58] Field of Search ............. 15/104.92, 210 B, 214, 15/218, 218.1; 118/270; 401/10

[56] References Cited

U.S. PATENT DOCUMENTS

| 1,540,379 | 6/1925 | Weaver | 118/270 |
| 1,916,933 | 7/1933 | Peck | 15/210 B |
| 2,453,452 | 11/1948 | Nielsen | 15/210 B |
| 2,810,923 | 10/1957 | Desso | 15/210 B |
| 2,922,180 | 1/1960 | Render | 15/244 R |
| 2,980,942 | 4/1961 | Dabney | 401/10 |
| 4,023,231 | 5/1977 | Haber | 15/210 B |

FOREIGN PATENT DOCUMENTS

| 275,750 | 7/1930 | Italy | 118/270 |
| 338,327 | 6/1959 | Switzerland | 15/210 B |

Primary Examiner—Daniel Blum
Attorney, Agent, or Firm—Wicks & Nemer

[57] ABSTRACT

An oil dip stick wiper device including a housing having end walls, a bottom, a top and sidewalls. Each of the end walls is formed with a slot extending from the upper end and terminating short of the lower end of the end wall. The top is formed with a slot extending throughout the length thereof and coterminous with the slots in the end walls. An oil absorbent cartridge having a V-slot extending through one side thereof is positioned in the housing in line with the slots of the top and end walls. The cartridge is spaced at each end from the end walls of the housing which allows wiped oil to drain into the housing from the ends of the cartridge downwardly and into the bottom of the housing. The housing has projections formed on the inner surfaces of the end walls and bottom wall which support the cartridge spaced from the end walls and the bottom so as to allow excess oil to be collected at the bottom of the housing. Mounted on a sidewall of the housing are a pair of clips for mounting the housing upon an acceptable item.

1 Claim, 5 Drawing Figures

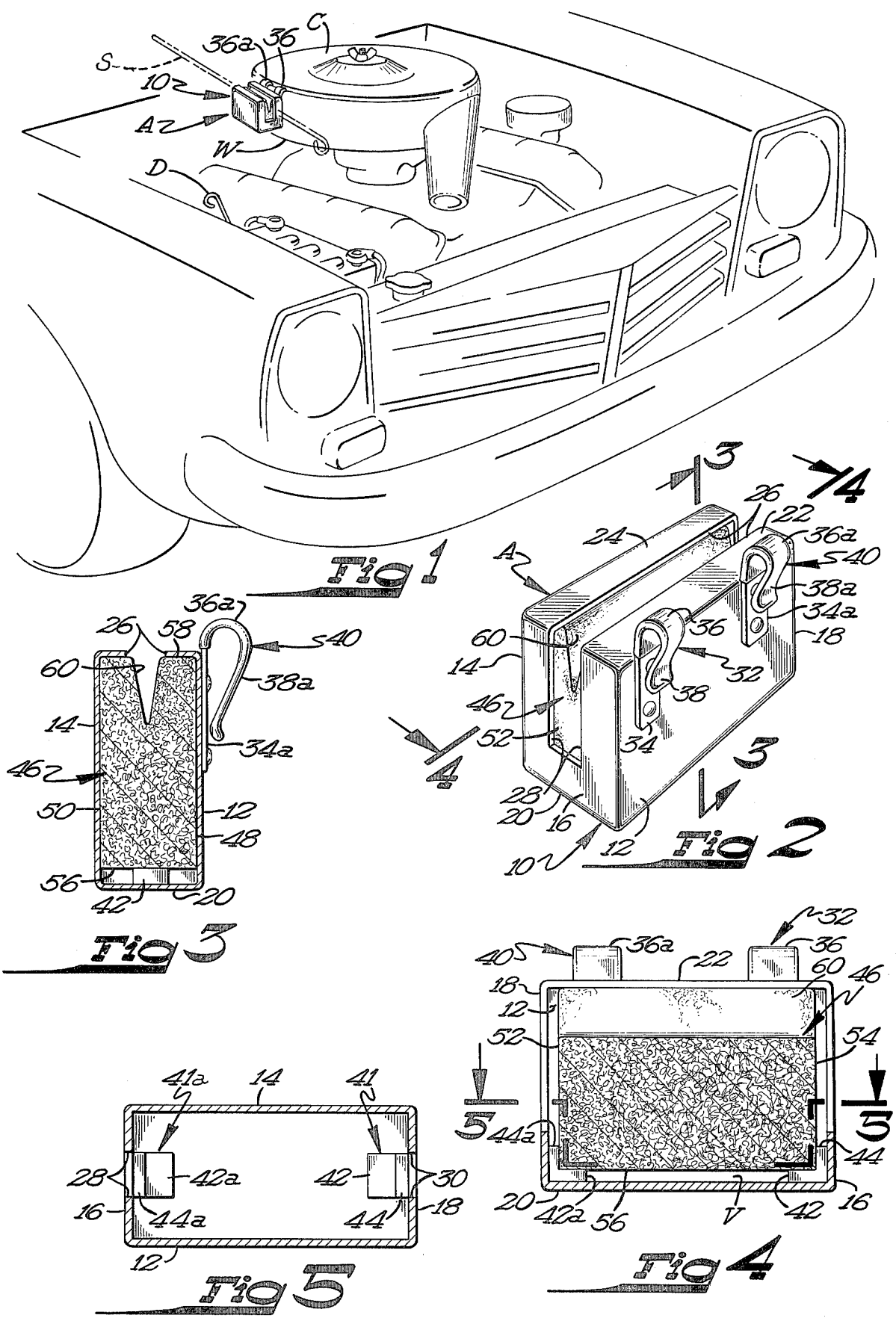

OIL DIP STICK WIPER

SUMMARY

The invention relates to an improvement in a device on which to wipe a conventional oil dip stick for measuring the amount of oil in the crankcase of an internal combustion engine.

Known oil dip stick wipe devices have certain drawbacks such as oil may run from the device when the dip stick is drawn through the same or it is mountable only in a poor position for use. Other forms of dip stick wipe devices have complicated or inadequate mounting means.

It is therefore an object of the invention to provide an oil dip stick wiper device which positively and adequately wipes oil from the stick and which contains oil wiped from a dip stick. It is a further object of the invention to provide an oil dip stick wiper device which has clips thereon for easily and simply mounting the wiper on an element such as the rim of the housing for an air cleaner where it is easily available for use.

The invention will appear more clearly from the following detailed description when taken in connection with the accompanying drawings, showing by way of example a preferred embodiment of the inventive idea wherein like numerals refer to like parts throughout.

In the drawings forming part of this application:

FIG. 1 is a perspective view of an oil dip stick wiper embodying the invention and shown as attached to the wall of an air cleaner housing of an automobile.

FIG. 2 is a perspective of the device.

FIG. 3 is a sectional view on the line 3—3 of FIG. 2.

FIG. 4 is a sectional view on the line 4—4 of FIG. 2.

FIG. 5 is a sectional view on the line 5—5 of FIG. 4 with the absorbent cartridge removed.

Referring to the drawings in detail, the oil dip stick wiper A includes the housing 10 formed of the spaced sidewalls 12 and 14 connected by the spaced end walls 16 and 18. Further provided is the bottom wall 20 connected to the lower edges of the side and end walls.

The numeral 22 designates a first partial top wall connected at its longitudinal outer edge to the sidewall 12 and at its ends to the end walls 16 and 18. Also included is a second partial top wall 24 connected at its longitudinal outer edge to the sidewall 14 and at its ends to the end walls 16 and 18. The inner edges of the partial top walls are spaced to form a slot 26 therebetween.

The numeral 28 designates a slot formed in the end wall 16 the lower end of the slot being spaced from the lower edge of the end wall. The slot 28 terminates at its upper-end and is coterminous with slot 26. A slot 30 is formed in the end wall 18, the lower end of the slot being spaced from the lower edge of the end wall 18. The slot 30 terminates at its upper end and is coterminous with slot 26 and slot 30 is of the same length as slot 28. The slots 28 and 30 terminate at the lower end short of the lower end of the respective end walls so that an accumulation of oil in the housing is contained therein.

Further provided is a first clip 32 which includes the flat base portion 34 terminating in the bight 36 which terminates in the arcuate tongue portion 38 depressed towards the base 34. The numeral 40 designates a second clip identical to clip 32, identical portions bearing identical reference numerals but accompanied by the lower case letter a.

The housing 10 also includes the identical support members 41 and 41a for supporting the cartridge hereinafter described and only the member 41 is described here with identical parts in member 41a having identical reference numerals but accompanied by a lower case letter a. The member 41 includes the projection in the form of the flat base portion 42 which terminates in the projection in the form of the right angular flat upright portion 44. The members 41 and 41a may be secured to the end walls by an adhesive or may be molded integrally with the end walls 16 and 18 and bottom wall 20.

Additionally provided is the oil absorbent cartridge or pad 46 which is rectangular and block like in formation. The cartridge may be made of felt, a cellular absorbent material or the like. The cartridge is formed with the flat parallel sides 48 and 50, the flat parallel ends 52 and 54 and the flat bottom 56 and top 58. The top 58 is formed with the V-cut 60. The cartridge may be compressed and forced into the housing 10 with the bottom of the cartridge resting on the portions 42 and 42a of the support members 41 and 41a thereby forming a void V beneath the cartridge where oil may collect that is wiped from a dip stick in the use of the device.

Further, the cartridge 46 is of a length less than the internal length of the housing whereby it abuts at each end the upright projections 44 and 44a of the supports 41 and 41a and thereby maintains a space or void between the ends of the cartridge and the end walls of the housing. As a result excess oil wiped by the cartridge can run down the cartridge ends and into the void below the cartridge. The lower end of the V-cut 60 is spaced from the lower end of the slots 28 and 30 whereby the dip stick when drawn through the V-cut does not scrape the lower edges of the slots 28 and 30 and oil accumulated by wiping can travel through the voids at the ends of the cartridge and down to the void V below the cartridge.

In using the device A, the same may be mounted, for example, on the upright wall W of the air cleaner C by clipping the clips 32 and 40 upon the wall at a position on the wall whereby an oil dip stick S may be drawn through the V-cut 60 to clean oil from the stick. Oil is wiped and absorbed by the pad, and any excess oil passes the ends of the pad and moves down into the void V in the housing beneath the pad.

Having thus described the invention, what is claimed as new and desired to be secured by Letters Patent is:

1. An oil dip stick wiper compromising:
   (a) a housing having spaced flat sidewalls,
   (b) flat end walls of a length less than said sidewalls
   (c) a flat bottom and
   (d) a top,
   (e) each of said end walls having a slot extending from the upper end and terminating short of the lower end of the wall,
   (f) said top having a slot extending throughout the length thereof and coterminous with said slots in said end walls,
   (g) an oil absorbent pad of a length less than the internal length of the housing,
   (h) each of said end walls having an L-shaped projection with one leg thereof carried by the inner surface of the end wall for positioning the pad spaced from the end wall and with the other leg carried by the bottom for positioning the pad spaced from the bottom,
   (i) said pad having a slot formed in the upper edge thereof coterminous with said slot in said top,
   (j) hook-like clip means mounted on the flat outer surface of a sidewall of said housing for attaching the wiper to a portion of an internal combustion engine.

* * * * *